Oct. 21, 1969  J. E. ULLMAN ET AL  3,473,447
IMPACT SEALER FOR CASES
Filed March 20, 1968  9 Sheets-Sheet 1

INVENTORS
JOHN E. ULLMAN &
STANLEY F. OLEJKOWSKI
BY
*Busser Smith & Harding*
ATTORNEYS Oct. 21, 1969　　　J. E. ULLMAN ET AL　　　3,473,447
IMPACT SEALER FOR CASES Filed March 20, 1968　　　　　　　　　　　　　　　9 Sheets-Sheet 3

INVENTORS
JOHN E. ULLMAN &
STANLEY F. OLEJKOWSKI
BY

ATTORNEYS

INVENTORS
JOHN E. ULLMAN &
STANLEY F. OLEJKOWSKI
BY
ATTORNEY

INVENTORS
JOHN E. ULLMAN &
STANLEY F. OLEJKOWSKI
BY
John F. A. Earley
ATTORNEY

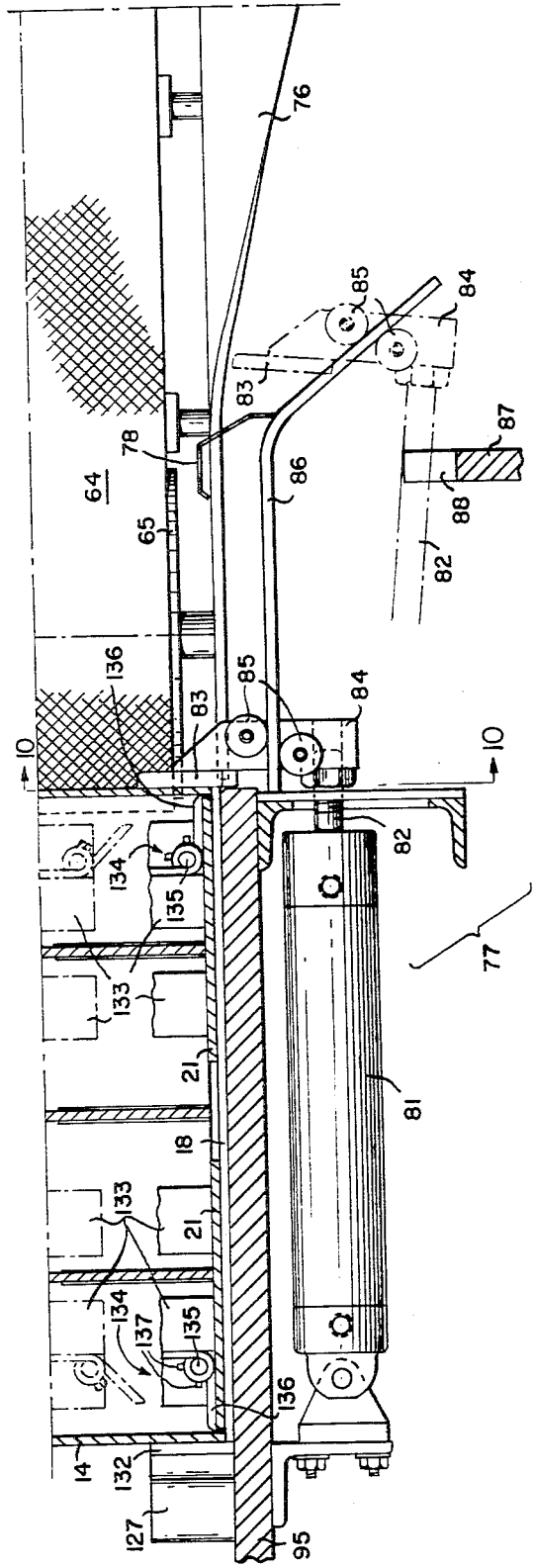
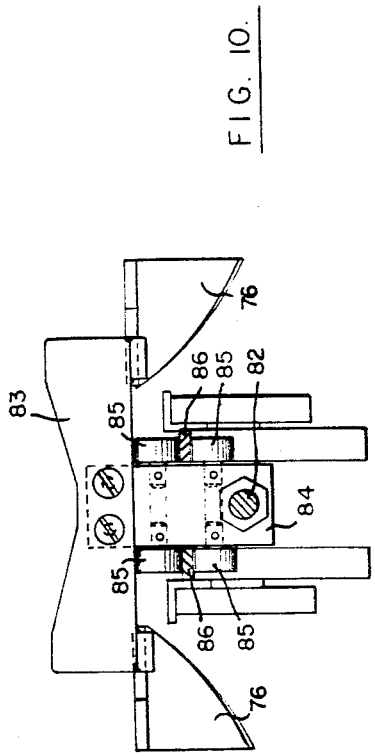

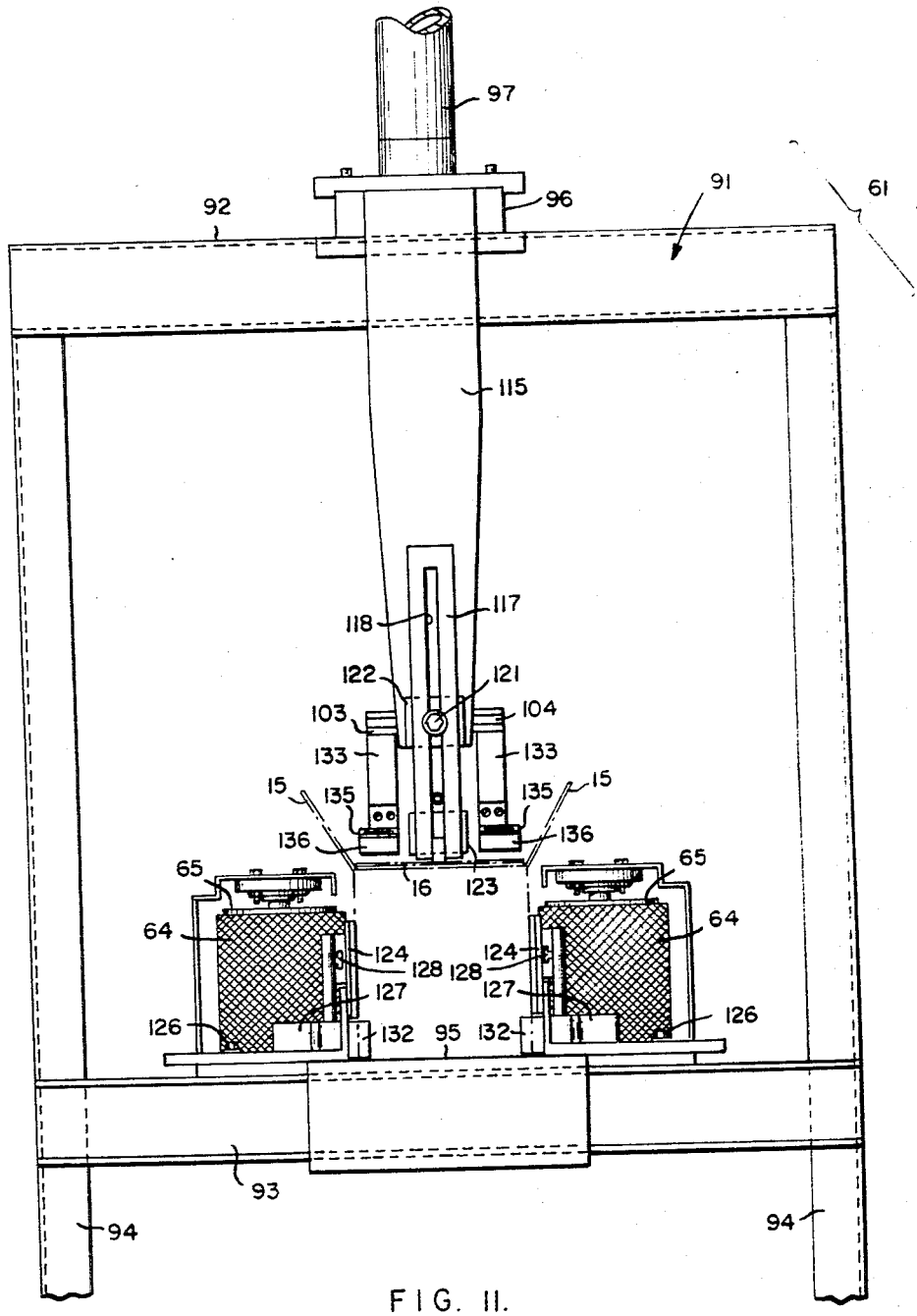

United States Patent Office 3,473,447
Patented Oct. 21, 1969

3,473,447
IMPACT SEALER FOR CASES
John E. Ullman, Huntingdon Valley, and Stanley F. Olejkowski, Roslyn, Pa., assignors to Huntingdon Industries Incorporated, Bethayres, Pa., a corporation of Pennsylvania
Continuation-in-part of application Ser. No. 470,131, July 7, 1965. This application Mar. 20, 1968, Ser. No. 715,482
Int. Cl. B31b 1/28, 1/62
U.S. Cl. 93—363
13 Claims

ABSTRACT OF THE DISCLOSURE

An impact sealer for corrugated paperboard cases which seals together the bottom flaps of an empty case, including a fixedly mounted base plate, a reciprocable ram positioned above the base plate and adapted to strike the bottom flaps and press them against the base plate to seal the bottom flaps together, a resilient pad mounted in the ram to insure flush contact with the bottom flaps, case puller means for catching the rear end panel of the case and pulling the case into position beneath the ram, retractable stop means for contacting the front bottom corners of the case to assist in positioning the case beneath the ram, squaring means mounted on the corners of the ram adapted to flatten and expand into the bottom corners of the case upon striking the bottom flap to thereby square the bottom of the case, means for preventing unwanted turning of the ram, means for holding down the front and rear top flaps so that they do not interfere with the operation of the ram, and blower means for assisting in ejecting the case from beneath the ram after its bottom flaps have been sealed. One embodiment of the invention includes a ram having spaced-apart fingers which are adapted to enter the chambers of a partition in the case.

CROSS REFERENCE TO RELATED APPLICATIONS

This patent application is a continuation-in-part of our co-pending patent application Ser. No. 470,131, filed July 7, 1965, now abandoned.

BACKGROUND OF THE INVENTION

This invention relates to an impact sealer for cases, and more particularly concerns an impact sealer for corrugated paperboard cases which have a pair of side panels joined together by a pair of end panels and have top and bottom flaps extending therefrom. The impact sealer seals together the bottom or top flaps of the case.

Cases or boxes made of corrugated paperboard or the like are widely used for shipping articles. In the glass industry, for example, it is customary for a manufacturer of glass bottles to ship the bottles in corrugated paperboard cases to his customer who removes the bottles, fills and caps them, and then reloads the filled bottles into the cases and ships the filled cases.

In shipping from the glass bottle manufacturer, the bottom flaps must be sealed to support the bottles, but the top flaps must be unsealed so that the bottles may be unloaded. After filling, the top flaps are sealed and the filled bottles are shipped in closed cases.

It has been a problem to provide apparatus for sealing the bottom flaps of a case in which empty bottles and the like are to be shipped. An empty case cannot be sealed in the conventional compression sealer because such a sealer cannot contact the inner flaps and therefore cannot squeeze the glued flaps together to get a good seal. It has been proposed to provide for sealing an empty case in a compression sealer by placing a wood block inside the case while it is being sealed and then removing the block after sealing has been completed. However, such apparatus is expensive, and it requires the operations of placing the case on the wood block or mandrel by hand, then applying glue to the bottom flaps, then passing the case through a compression unit, and then stripping the case off the mandrel. These operations are expensive and are time consuming so that the rate of production is rather slow.

SUMMARY OF THE INVENTION

Accordingly, it is an object of this invention to provide an impact sealer which overcomes the problems of the prior art and eliminates the necessity for using a wood block or mandrel, and eliminates the operations of inserting a mandrel into a case and then removing the mandrel after sealing of the bottom flaps has been accomplished.

It is another object to provide an impact sealer which takes up less space than the conventional compression unit.

It is another object to provide an impact sealer which is adapted to seal the bottom of a case having a partition inserted in the case, and is also adapted to seal the bottom flaps of a case with no partition inserted therein.

It is another object to provide an impact sealer which is adapted to seal the top flaps of a filled case, such as a case filled with filled cans.

BRIEF DESCRIPTION OF THE DRAWINGS

Other objects and advantages of this invention, including its simplicity and economy, will further become apparent hereinafter and in the drawings, in which:

FIG. 9 is a partial view on an enlarged scale of the impact sealer of FIG. 8 with the ram in extended position;

FIG. 10 is a view in section taken as indicated by the lines and arrows 10—10 which appear in FIG. 9;

FIG. 11 is a view in front elevation of the impact sealer of FIG. 8; and

DESCRIPTION OF THE PREFERRED EMBODIMENTS

Figure 1:
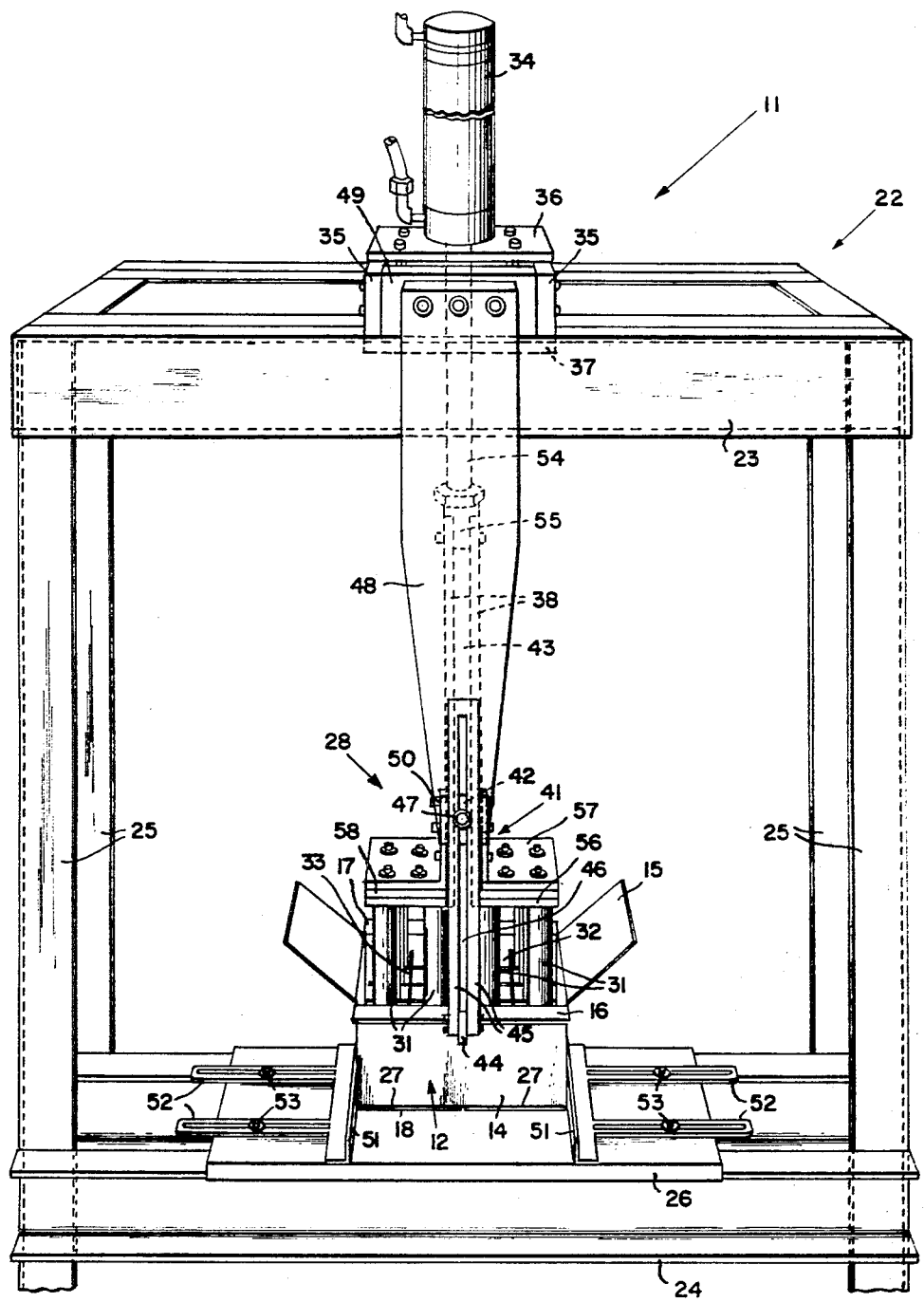
FIG. 1 is a front view in perspective of an impact sealer constructed in accordance with this invention.

Although specific terms are used in the following description for clarity, these terms are intended to refer only to the structure shown in the drawings and are not intended to define or limit the scope of the invention.

Turning now to the specific embodiments of the invention selected for illustration in the drawings, there is shown an impact sealer 11 which is adapted to seal the bottom flaps of a case 12 made of corrugated paperboard or the like. Case 12 includes a pair of side panels 13 joined together by a pair of end panels 14. Top flaps 15 extend from side panels 13, and a leading top flap 16 and a trailing top flap 17 extend from end panels 14.

On the bottom of case 12, bottom flaps 18 extend from side panels 13 and and bottom flaps 21 extend from end panels 14 and are folded inside bottom flaps 18 in the bottom sealed case.

Impact sealer 11 includes a frame 22 having upper and lower cross channels 23 and 24 which extend between upright members 25.

A base plate 26 is fixedly mounted on lower cross channels 24 and is adapted to support a case 12 having its bottom flaps closed with bottom flaps 21 inside the bottom flaps 18 and with a freshly applied layer 27 of glue between them. The term "glue," as used herein, is defined as meaning any adhesive, such as a polyvinyl acetate resin emulsion, suitable for fastening together the flaps of a case.

The glue is applied to the corner areas of the long bottom flaps 18 by a glue machine which applies the glue at corner areas where the bottom flaps 21 overlap flaps 18.

A reciprocable ram 28 is positioned above base plate 26 and is adapted to press bottom flaps 18 and 21 against the base plate to seal the bottom flaps together. It is to be noted that base plate 26 is rigidly supported and that the ram 28 strikes the bottom flaps and the base plate with considerable force to insure a proper seal.

Figure 2:
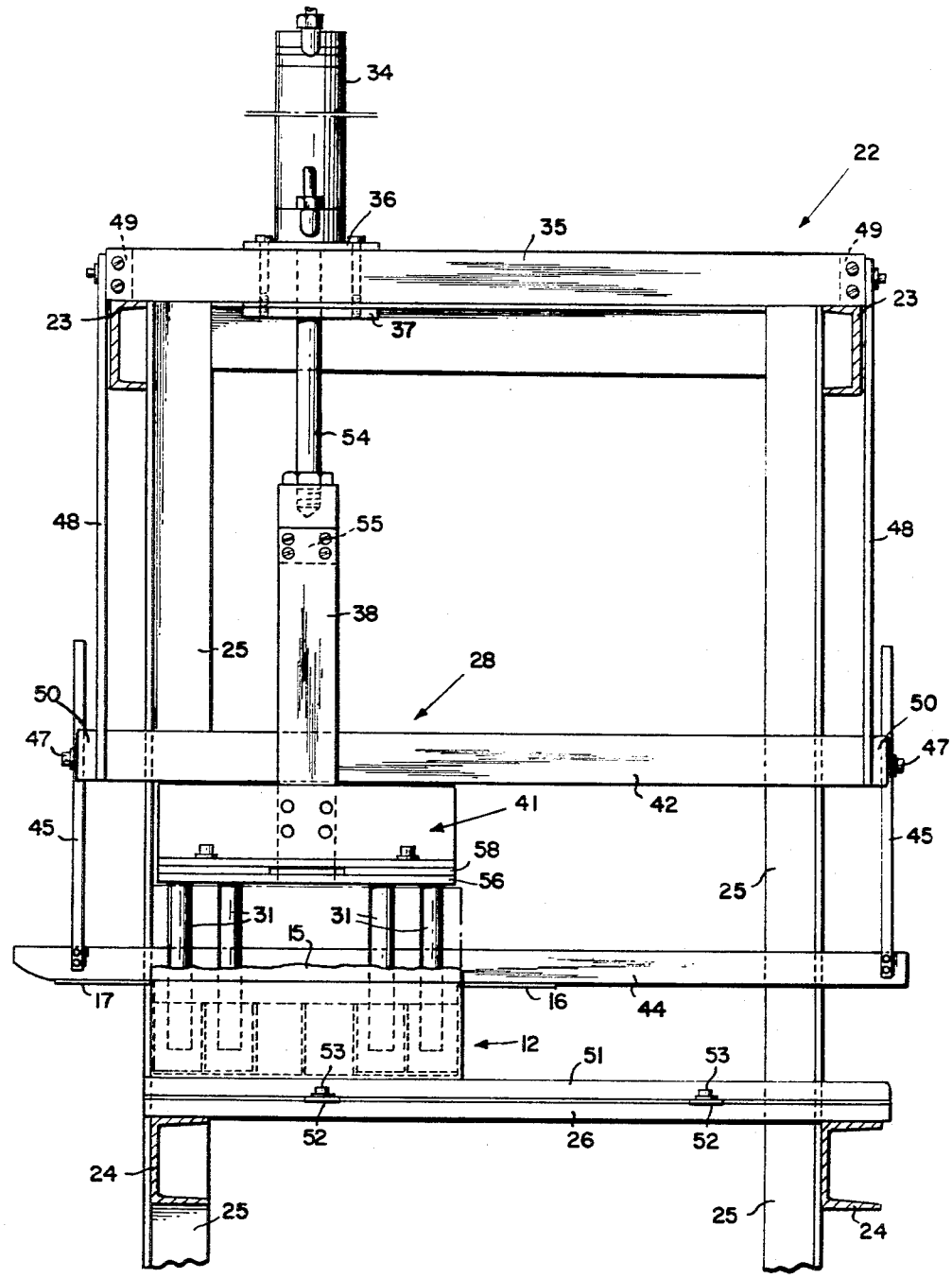
FIG. 2 is a side view of the impact sealer of FIG. 1.

In the embodiment of FIGS. 1 and 2, the ram 28 is provided with a plurality of rod-shaped fingers 31 extending from the bottom of the ram and adapted to pass through chambers 32 formed in a partition 33 that has been inserted in case 12.

Ram 28 is actuated by an air cylinder 34 slidably mounted on rails 35 which are supported on upper cross channels 23 above base plate 26. Air cylinder 34 is connected to rails 35 by top and bottom plates 36 and 37 securely bolted and clamped in position when air cylinder 34 is properly positioned for the dimensions of the case to be sealed. This arrangement provides for moving air cylinder 34 and ram 28 into a position directly over the center of the case being bottom sealed in order to accommodate cases of various sizes.

Impact sealer 11 is provided with means for preventing unwanted turning of the ram so that it fits squarely into the case, and such means includes two spaced-apart vertical extension bars 38 extending upwardly from ram head 41, and a crosspiece 42 positioned in the space 43 between bars 38 to prevent bars 38 from turning in their reciprocal motion. In addition to preventing unwanted rotation of ram 28, the crosspiece 42 braces end plates 48 that are bolted at the top to spacer bars 49 which extend between rails 35.

The cases 12 being fed into impact sealer 11 have top flaps 15, 16 and 17 which must be kept out of the way of the ram 28. To accomplish this, the side panel top flaps 15 are bent outwardly just prior to being inserted into the impact sealer 11 and they have sufficient memory to retain their outwardly extending position which is out of the path of the ram.

Leading flap 16 and trailing flap 17 are held down and out so that they do not interfere with the operation of the ram 28 hold down means which includes a flap hold down bar 44 positioned above base plate 26. Adjustable mounting means are provided for supporting flap hold down bar 44 in order to accommodate cases of various sizes, and such means includes brackets 45 having slots 46. Bolts 47 fasten brackets 45 to end plates 48, and guide blocks 50 are mounted on plates 48 to guide the brackets 45 to hold them in proper position to insure that bar 44 is properly positioned between bars 38.

A pair of guide bars 51 are positioned on base plate 26 and are spaced apart the width of case 12 so as to guide the case into proper position beneath ram 28. Guide bars 51 are fastened to base plate 26 in an adjustable manner by means of slotted legs 52. Bolts 53 connect the legs 52 to the base plate. Accordingly, the position of guide bars 51 may be adjusted in order to accommodate cases of various sizes.

Air cylinder 34 has a piston rod 54 extending downwardly therefrom and terminating in a piston rod mounting block 55 to which is attached the upper ends of vertical extension bars 38.

In operation of the impact sealer of FIGS. 1 and 2, case 12 is inserted into the sealer with bottom flaps 18 and 21 closed and a freshly applied glue layer 27 on bottom flaps 18 in the corner areas. Leading and trailing top flaps 16 and 17 are held down by flap hold down bar 44. The ram 28 descends into case 12 and the bottom of fingers 31 strike the bottom flaps and press them together against base plate 26. The ram 28 is withdrawn from the case, and the bottom sealed case 12 is removed from the sealer 11 by a succeeding case which pushes the sealed case away.

Figure 3:
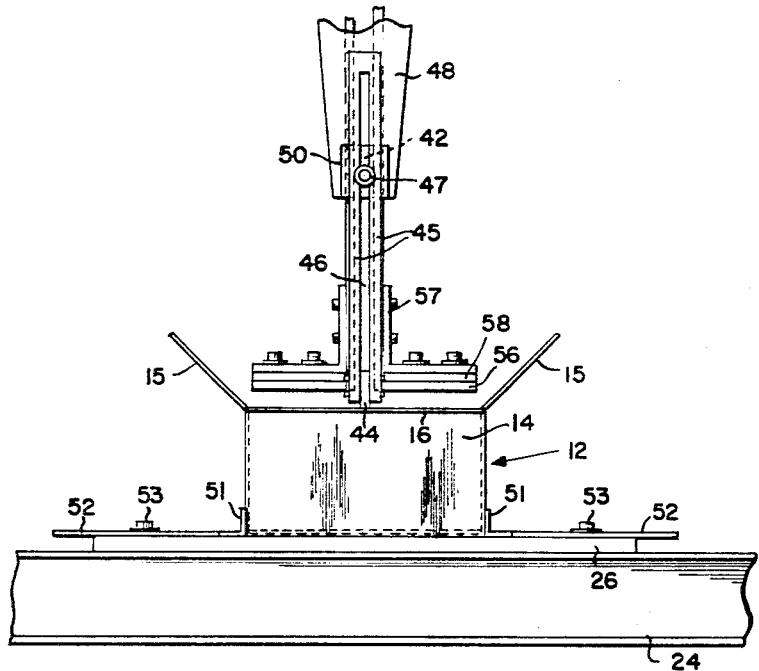
FIG. 3 is a front view of an alternative embodiment of the invention.
Figure 4:
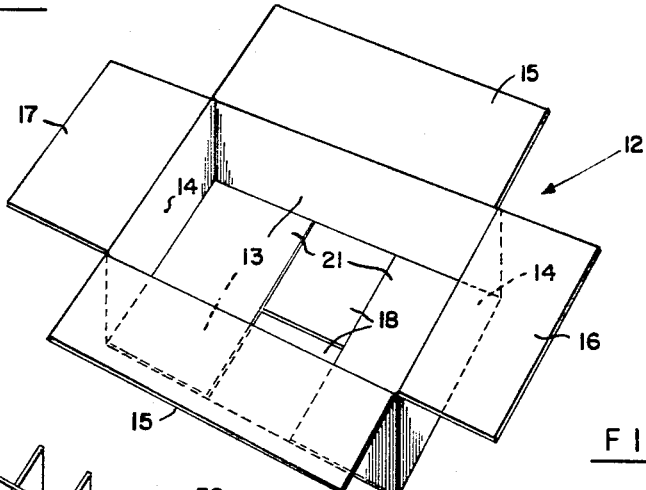
FIG. 4 is a view in perspective of a case which is adapted to be bottom sealed by the invention.
Figure 5:
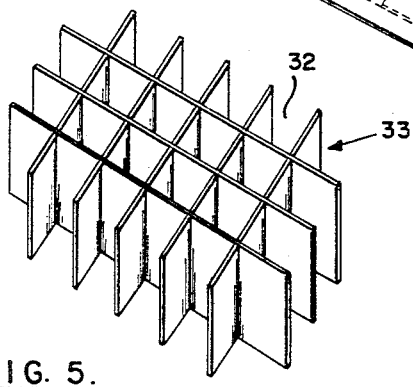
FIG. 5 is a view in perspective of an insert which is adapted to be inserted in the case prior to bottom sealing.

In the embodiment of the invention shown in FIG. 3, the parts are the same as the embodiment of FIGS. 1 and 2 except that fingers 31 have been removed. Pressure pads 56 strike the bottom of the case which does not have a partition 33 inserted therein. Pressure pads 56 are mounted on angles 57 of the ram head, and resilient pads 58 are positioned between pads 56 and angles 57 in order to cushion the blow of the ram and to insure that the pads are flush with the bottom of the case. Resilient pads 58 are also provided with the embodiment FIGS. 1 and 2.

The operation of the embodiment of FIG. 3 is the same as that of FIGS. 1 and 2, except that the pressure pads 56 strike the bottom of the case.

Both embodiments are automatically controlled by the automatic insertion of boxes into the machine.

It is to be noted that the operator of the impact sealer who sets up the case may also insert the partition therein at the same time without interfering with the operation of the impact sealer of FIGS. 1 and 2. This is an improvement on the conventional operation wherein the partition was inserted after bottom sealing, and was inserted by a separate operation.

Figure 6:
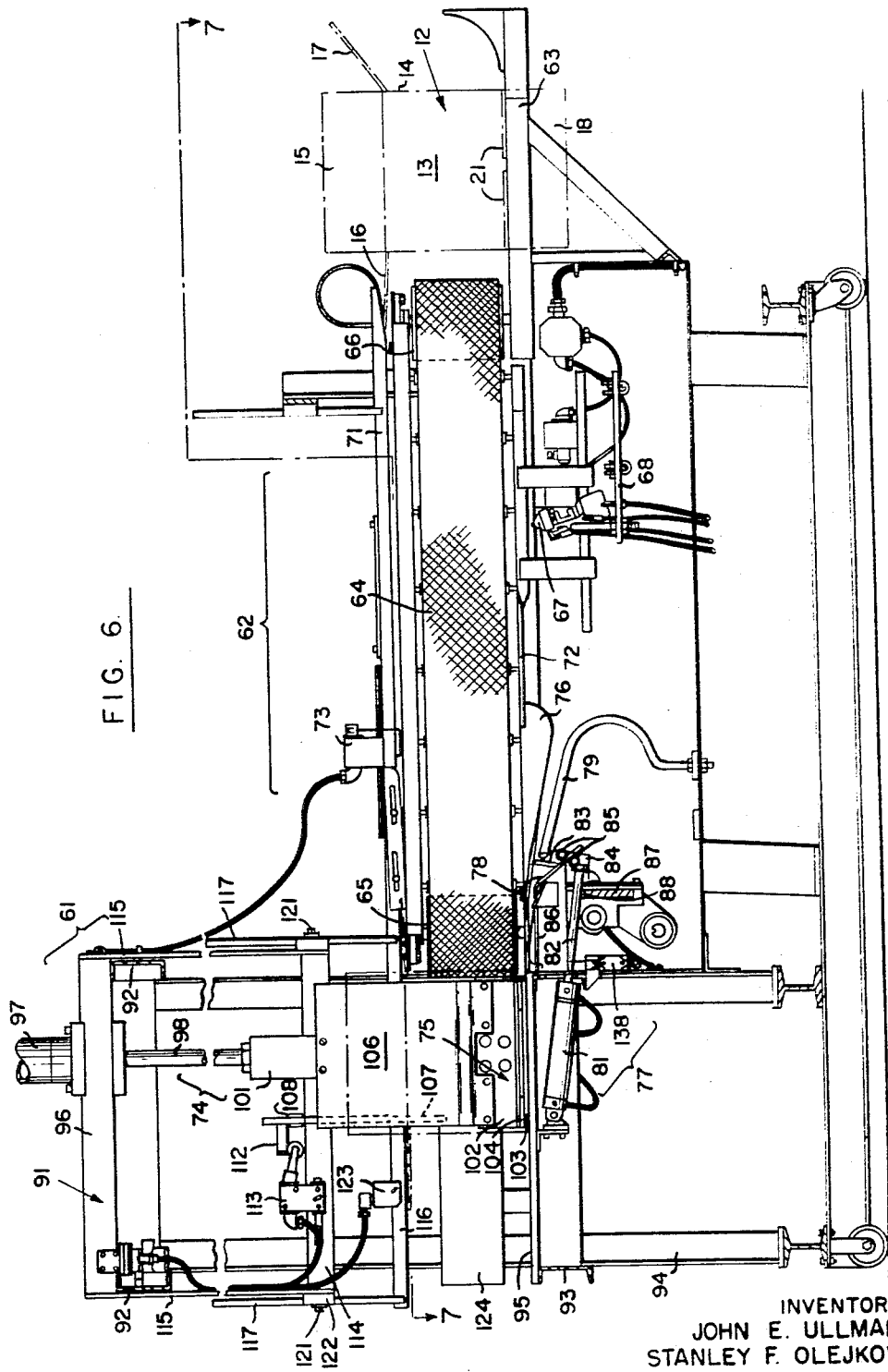
FIG. 6 is a view in longitudinal vertical section of another embodiment of the invention.
Figure 7:
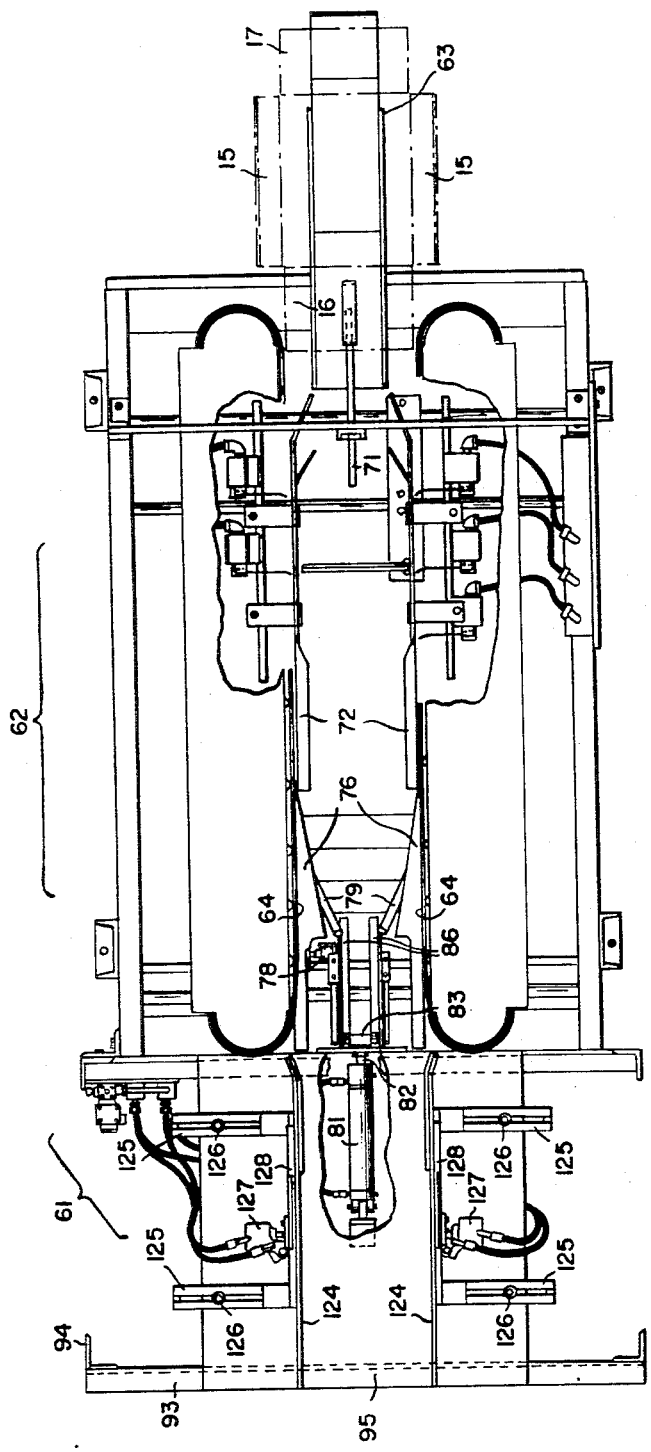
FIG. 7 is a view in top plan, partly cut away, of the impact sealer of FIG. 6 taken along the lines and arrows 7—7 which appear in FIG. 6.
Figure 8:
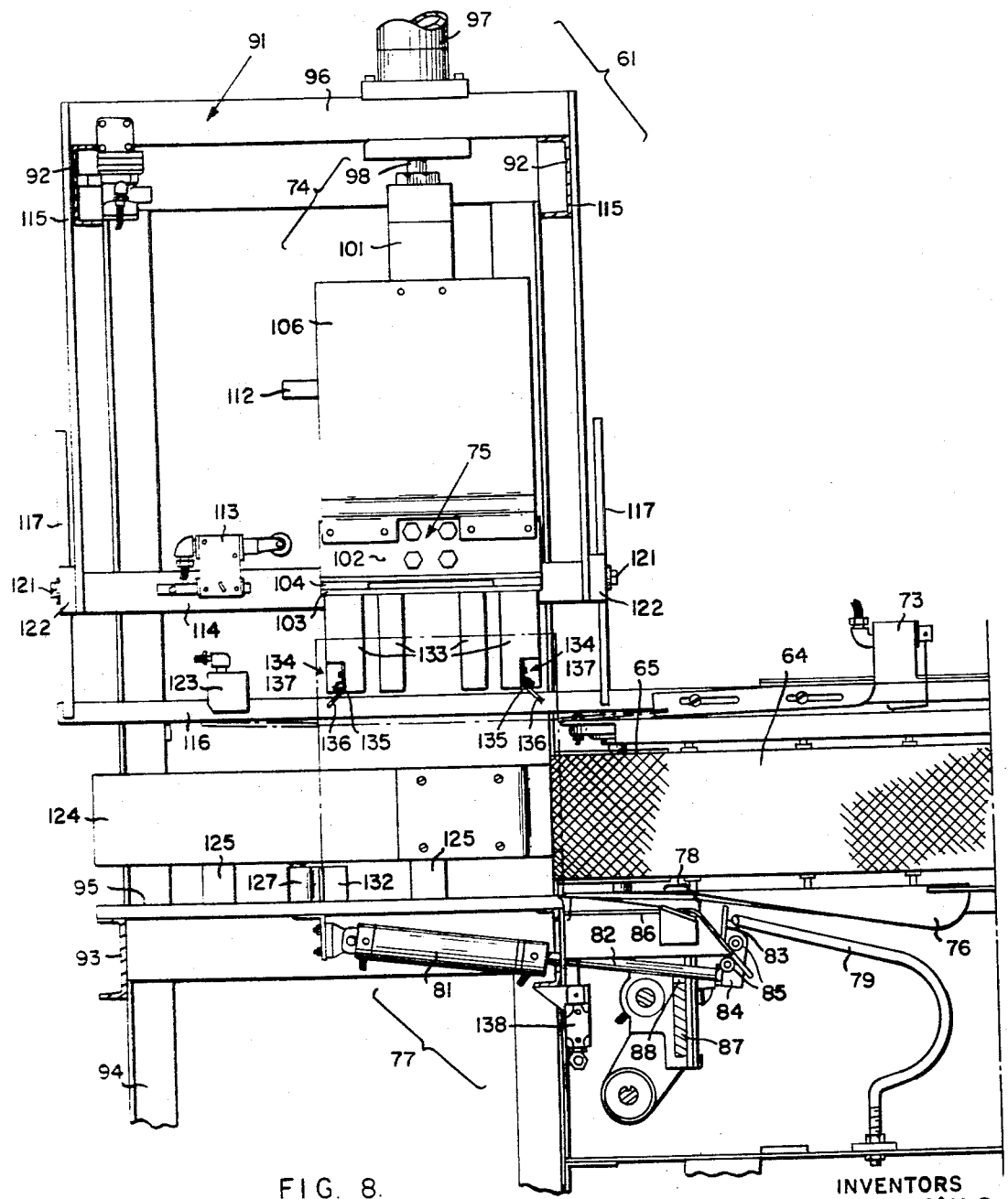
FIG. 8 is a partial view similar to FIG. 6 on an enlarged scale of another embodiment of the invention with the ram in retracted position.
Figure 12:
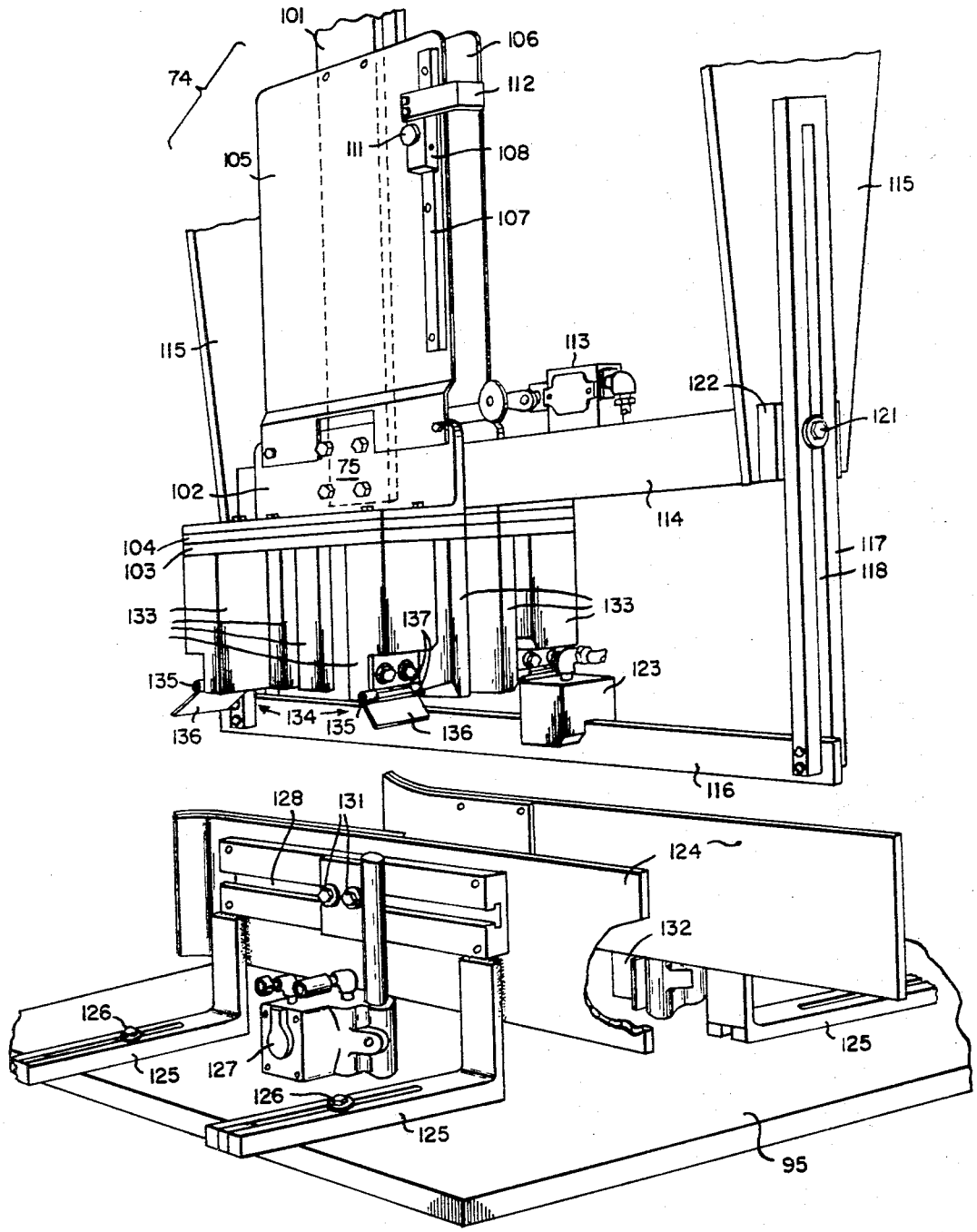
FIG. 12 is a view in perspective of the impact sealer of FIG. 8.

Turning now to the embodiment of the invention shown in FIGS. 6 and 7, there is shown an impact sealer 61 which is fed by a side belt gluer 62. Side belt gluer 62 includes a feed member 63 on which the operator sets up the case 12 with bottom flaps 21 bent inwardly and bottom flaps 18 depending downwardly. Top flaps 16 and 17 are bent outwardly and top flaps 15 extend upwardly. Case 12 is inserted by the operator in between side belts 64 which are power driven and are trained around side belt rollers 65 and 66. Belts 64 have vertical belt surfaces that contact the side panels of the case and move the case forwardly past a glue station that includes multi-jet spray guns 67 mounted on supports 68 beneath the path of travel of the case 12. The spray guns apply the adhesive to the bottom flaps 21 as the case passes above spray guns 67.

An upper flap guide 71 holds upper flaps 16 and 17 in a horizontal position, and lower flap guides 72 keep the lower flaps 18 in their downwardly depending position. Flap guides 72 also keep flaps 21 in their up position as the case passes towards the impact sealer.

A switch 73 is mounted on upper flap guide 71 and is adapted to be contacted by the advancing case 12 to actuate ram 74 and bring ram head 75 to its upper retracted position. As the case 12 progresses toward impact sealer 61, moved in that direction by the power-driven side belts 64, bottom flaps 18 are brought into horizontal position in contact with bottom flaps 21 by plows 76 and flap folders 79.

Belts 64 push the case 12 part way into impact sealer 61, to position where the rear of side panels 13 are no longer in contact with side belts 64. This occurs at the point where the belt 64 departs from the tangent to belt roller 65 and starts to travel around the roller in contact with the roller surface for 180° rotation of the roller until the belt again leaves the surface of roller 65 to start its return journey to roller 66.

To pull case all the way into position in impact sealer 61, a case puller mechanism 77 is provided and includes a switch 78 that is tripped by the advancing case 12 to actuate an air cylinder 81 having a piston rod 82 with a case pull bar 83 mounted on its outer end.

Case puller mechanism 77 is shown on an enlarged scale and in greater detail in FIGS. 9 and 10. Pull bar 83 is mounted on a support member 84 and has a pair of rollers 85 extending from each side that are adapted to ride on cam track 86 to bring the case pull bar 83 from its rod-extended position below the path of cases 12 as shown in FIG. 9, to its rod-retracted position behind and in contact with rear panel 14 as shown in full lines in FIG. 9. As support and guide bar 87 is provided with a notch 88 that provides clearance for piston rod 82. Case pull bar 83 contacts the rear end panel 14 of case 12 and pulls the case into position beneath ram head 75.

Impact sealer 61 includes a frame 91 having upper cross channels 92, lower cross channels 93, upright members 94, a base plate 95 which is fixed in position and is solidly constructed so as to withstand the heavy impact of the ram 74, and upper rails 96 which span upper cross channels 92 and adjustably support air cylinder 97 of ram 94.

A piston rod 98 extends downwardly from air cylinder 97 and a pair of spaced-apart vertical extension bars 101 connect the bottom of piston rod 98 to a pair of angles 102 of ram head 75. Bolted to angles 102 are pressure pads 103, with resilient pads 104 positioned therebetween to cushion the blow of the ram and to insure that the pressure pads 103 become flush with the bottom of the case.

A pair of guard plates 105, 106 are mounted between vertical extension bars 101 and angles 102. Plate 105 supports a cam track 107 having a slidably mounted adjusting block 108 which can be locked in any position along cam track 107 by a locking bolt 111. A cam 112 extends outwardly from adjusting block 108 and is adapted to trip a switch 113 mounted on crosspiece 114.

Crosspiece 114 is positioned in the spaced between vertical extension bars 101 and prevents bars 101 from turning as they reciprocate up and down with the ram head 75. This prevents unwanted rotation of ram head 75. Crosspiece 114 connects end plates 115 together and braces the end plates to give a more stable structure. Leading and trailing flaps 16 and 17 of case 12 are held down in impact sealer 61, so that they do not interfere with the operation of ram 74, by hold-down means which includes a flap hold-down bar 116 positioned above the base plate 95. Adjustable mounting means are provided for supporting flap hold-down bar 116 so as to accommodate cases of various sizes and heights of panels, and such means includes brackets 117 having slots 118. Bolts 121 fasten the brackets 117 to end plates 115, and guide blocks 122 mounted on plates 115 guides the brackets 117 and hold them in proper position to insure that bar 116 is properly positioned between vertical extension bars 101.

An air-blast jet 123 is mounted on flap hold-down bar 116 above the path of case travel and forward of ram 74 and is adapted to blow air against the inside surface of the front end panel of the case to quickly eject the case from the impact sealer 61. The sealed case is pushed into position beneath air-blast jet 123 by a following case as it is pushed part way into impact sealer 61 by side belts 64.

A pair of guide plates 124 are positioned on base plate 95 and are spaced apart the width of case 12 so as to position the case properly in transverse position beneath the ram head 75. Guide plates 124 are fastened to base plate 95 in an adjustable manner by means of slotted legs 125 connected to the base plate 95 by bolts 126 that provide for lateral adjustment of the guide plates 124 so as to accommodate cases of various widths.

An air cylinder 127 is mounted behind each plate 124 in a track 128. Air cylinders 127 may be moved to various positions along a track 128 and locked by bolts 131. A pair of corner stop members 132 are mounted on the end of the piston rods extending from air cylinders 127 and form retractable stop means for catching the front bottom corners of the case 12 to position the case beneath the ram head 75.

The embodiment of the invention shown in FIGS. 8 through 12 differs from the embodiment shown in FIGS. 6 and 7 only in that the ram head 75 is provided with pressure fingers 133 depending therefrom which are spaced apart and are adapted to enter the chambers 32 of partition 33. The bottom portion of pressure fingers 133 are beveled for easy insertion into the chambers of the partition since such partitions are generally constructed of rather flimsy material that would bend easily and crumple if contacted by a downward stroke of the pressure fingers. The pressure fingers 133 are rectangular in shape in order to give more pressure surface at the bottom of the fingers which makes contact with the bottom flaps of the cases.

The four corner pressure fingers 133 have hinges mounted thereon which face forwardly on the front fingers and rearwardly on the rear fingers with a hinge pin 135 mounted on the fingers in such a manner that bottom hinge member 136 is flush with the bottom of the finger when the ram is in the extended position pressing the bottom flaps of the case against base plate 95 to effect a seal between the bottom flaps. Except when in this position, hinge member 136 is held by stop bars 137 in a position about 45° from the vertical. The hinges 134 provide means for squaring the case 12 by flattening against the flaps and expanding into the bottom corners of the case to move front end panel 14 forwardly and rear end panel 14 rearwardly, so that bottom flaps 18 do not extend outwardly from end panels 14.

In operation, the operator sets up a case 12 on feed member 63 as shown in FIGS. 6 and 7 and shoves it forwardly between power-driven side belts 64 which contact side panels 13 and move case 12 forwardly with upper flap guide 71 holding down the leading and trailing flaps 16 and 17, and flap guides 72 holding bottom side flaps 18 in a vertical downwardly depending position and holding flaps 21 in horizontal position for spraying. As the belt 64 conveys the case past spray guns 67, the bottom of bottom flaps 21 are sprayed with adhesive. Then the advancing case contacts switch 73 to raise ram head 75 to its retracted position, and as the case 12 approaches impact sealer 61, the bottom flaps 18 are folded into horizontal position in contact with bottom flaps 21 by the plows 76 and flap folders 79. When side belts 64 reach front belt rollers 65, the belts 64 disengage from side panels 13 of the case 12, leaving the case only partly inserted into impact sealer 61.

The advancing case contacts switch 78 and initiates the air blast from jet 123. The advancing case 12 contacts any sealed case beneath the raised ram head 75 and begins to push it into the path of the air blast stream to fully eject it from the case sealer. When case 12 passes switch 78 and releases it, air cylinder 81 is actuated and moves case pull bar 83 from its extended position to follow a path along cam tracks 86 to catch the rear end panel 14 of case 12 and pull the case into position beneath the ram. Switch 78 is positioned so as to actuate case pull bar 83 before the rear end panel 14 reaches the front belt rollers 65, because at this point belts 64 disengage from side panels 13 of case 12, which would leave the case only partly inserted into impact sealer 61.

When switch 78 releases, it also operates corner stops 132 (FIG. 8) to move them into extended position.

As case pull bar 83 pulls the case into proper position in impact sealer 61, the corner stop members 132 catch the front bottom corners of the case. When the case puller reaches the end of its travel in pushing the case into impact sealer 61, it actuates a switch 138 that causes ram head 75 to descend and strike the bottom flaps of the case against the base plate 95 to effect a seal between the bottom flaps.

In the embodiment of FIGS. 6 and 7, pressure pads 103 strike the bottom flaps since there is no partition inserted in the case, and resilient pads 104 insure that the pressure pads 103 come into flush contact with the bottom flaps of the case and allow for any irregularity.

In the embodiment of the invention shown in FIGS. 8 through 12, the pressure fingers 133 enter the chambers 32 of the partition 33 and the bottom hinge member 136 makes first contact wtih the bottom flaps of the case. The bottom hinge members flatten and expand into the bottom corners of the case to thereby square the case bottom. Similar hinges may be attached to the ram head of FIGS. 6 and 7, if desired.

Having sealed the case, ram head 75 retracts and a following case is pushed part-way into impact sealer 61 by side belts 64 and pushes the sealed case forwardly from beneath the ram head. This moves the front panel of the case into the path of an air blast from jet 123 that quickly ejects the sealed case from the impact sealer 61 and makes room for the following case beneath ram head 75. The following case is caught at its front bottom corners by corner stop members 132 as it is pushed to that position by puller bar 83, and the operation is repeated.

During the downward movement of ram head 75, cam 112 makes contact with switch 113 which causes case pull bar 83 to return to its extended position and retracts corner stop members 132. Pull bar 83 then awaits the next case, and corner stop members 132 are out of the way so as to permit the ejection of the sealed case from impact sealer 61.

As ram head 75 descends, cam 112 preferably makes contact with the switch arm of switch 113 just before ram head 75 reaches the bottom of its stroke so that the case is held captive and in squared condition by the corner stop members 132 and the pull bar 83 until just before ram head 75 strikes the bottom flaps of the case.

The actuation of limit switch 113 also shuts off the air blast from air jet 123.

The pull bar 83 of the come-along device or case puller mechanism 77 has a tendency to push the rear end panel of the case inwardly about 1/8 or 1/4 of an inch. This is corrected by the squaring hinges 134 that are positioned at each corner of the ram head and depend at an angle of 45°. When they strike the bottom flaps of the case, they flatten and this tends to square and resize the case to overcome the effect of depression by pull bar 83.

The air-blast jet 123 blowing when the case contacts switch 78 which is before the sealed case has been pushed beneath jet 123 by the new case entering impact sealer 61. When the sealed case is pushed into position beneath air jet 123, the jet pushes against the inside of the front end panel and quickly ejects it from the impact sealer. Then the air jet remains on until it is shut off when descending cam 112 strikes the actuating arm of switch 113.

The quick ejection of the sealed case allows for movement of corner stops 132 into stop position to catch the next case to be sealed.

It is to be noted that pressure fingers 133 are made rectangular in cross section so as to provide more striking area against the glued bottom flaps of the case. Also, the bottom of the pressure fingers 133 are beveled for easy insertion into the chambers of the partition which are of flimsy construction and have end walls which are not always entirely straight. The bevel allows for easy insertion and avoids crumpling of the partition.

The resilient pads 104 absorb any misalignment or irregularities.

Impact sealer 61 is also adapted for sealing the top flaps of a case which is filled to the top, as with cans, for example, and is adapted to do so very quickly. Moreover, sealer 61 is adapted to seal a filled case by sealing the top and bottom flaps simultaneously. Impact sealer 61 gives a very fast bond.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

I claim:

1. An impact sealer for sealing the bottom flaps of a case which includes a pair of side panels joined together by a front end panel and a rear end panel, comprising a base plate which is fixedly mounted and adapted to support a case having its end and side bottom flaps closed with a freshly applied layer of adhesive therebetween a reciprocable ram positioned above the base plate and adapted to strike the bottom flaps and press them against the base plate to seal the bottom flaps together, and a pivotally-mounted case puller means positioned below the path of case travel, and cam means for bringing the case puller means into contact with the rear end panel of the case and pulling the case into position beneath the ram and for returning the case puller means to its original position beneath the path of case travel.

2. The impact sealer of claim 1, wherein said case puller means includes an air cylinder pivotally mounted at one end and having a piston rod extending from the other end with a support member mounted on the end of the piston rod, a case pull bar mounted on the support member, a cam track leading to the base plate, and a pair of rollers mounted on the support member and adapted to ride on the cam track, whereby the air cylinder piston pulls the case pull bar along the cam track to contact the rear of the case and pull it into position beneath the ram, and then returns the pull bar to its original position by pushing the cam pull bar along the cam track to a position beneath the path of the cases advancing toward the base plate.

3. The impact sealer of claim 1 including retractable stop means for catching the front bottom corners of the case to position the case beneath the ram.

4. The impact sealer of claim 1 including air-blower means for ejecting the case from the impact sealer after its bottom flaps have been sealed, and means for moving a succeeding case against the sealed case to move the sealed case beneath the blower means.

5. The impact sealer of claim 4 wherein said air-blower means is mounted above the case and forward of the ram and is adapted to blow air against the inside surface of the front end panel of the case.

6. An impact sealer for sealing the bottom flaps of a case which includes a pair of side panels joined together by a front end panel and a rear end panel, comprising a base plate which is fixedly mounted and adapted to support a case having its end and side bottom flaps closed with a freshly applied layer of adhesive therebetween, a reciprocable ram positioned above the base plate and adapted to strike the bottom flaps and press them against the base plate to seal the bottom flaps and press them together, said ram including a ram head having four corners, and squaring means mounted on the corners of the ram head adapted to flatten and expand into the bottom corners of the case upon striking the bottom flaps to thereby square the bottom of the case, said squaring means including a hinge member depending downwardly and stop bars adapted to hold the hinge member at an angle of about 45 degrees from the vertical until the hinge member strikes the bottom flaps.

7. The impact sealer of claim 6, wherein said ram is provided with spaced-apart fingers depending therefrom and adapted to enter the chambers of a partition positioned in said case, with the bottom portion of said fingers being bevelled for easy insertion into said chambers.

8. The impact sealer according to claim 6, wherein means are provided for preventing unwanted turning of the ram including two vertical extension bars extending upwardly from a ram head and movable therewith and having a space therebetween, and a crosspiece which is fixedly positioned in the space between the bars to prevent the bars from turning.

9. The bottom sealer of claim 6, wherein the case includes front and rear top flaps extending from the front and rear end panels, and wherein means are provided for holding down the front and rear top flaps so that they do not interfere with the operation of the ram.

10. The impact sealer of claim 9 wherein said hold-down means includes a flap hold-down bar which is positioned above the base plate and is contacted by the front and rear top flaps.

11. The impact sealer of claim 6, including two vertical extension bars extending upwardly from the ram head and movable therewith and having a space therebetween, a crosspiece fixedly positioned in the space between said bars to prevent the bars from turning, a flap hold-down bar positioned above the base plate and contacted by front and rear top flaps of the case, case puller means for catching the rear end panel of the case and pulling the case into position beneath the ram, retractable stop means for catching the front bottom corners of the case to position the case beneath the ram, and air-blower means for ejecting the case from the impact sealer after its bottom flaps have been sealed, said air-blower means being mounted above the case and forward of the ram and being adapted to blow air against the inside surface of the front end panel of the case.

12. The impact sealer of claim 11, wherein said ram is provided with spaced-apart fingers depending therefrom and adapted to enter the chambers of a partition positioned in said case, said fingers being rectangular in cross section and with the bottom portions of said fingers being bevelled for easy insertion into said partition chambers.

13. An impact sealer for sealing the bottom flaps of a case which includes a pair of side panels joined together by a front end panel and a rear end panel, comprising a base plate which is fixedly mounted and adapted to support a case having its end and side bottom flaps closed with a freshly applied layer of adhesive therebetween, a reciprocable ram positioned above the base plate and adapted to strike the bottom flaps and press them against the base plate to seal the bottom flaps together, case puller means for contacting the rear end panel of the case and pulling the case into position beneath the ram, and retractable stop means for catching the front bottom corners of the case to position the case beneath the ram, said retractable stop means including a pair of corner stop members, and air cylinder means for moving the corner stop members into position to catch the front bottom corners of the case and capture the case between the corner stop members and the case puller means, and for retracting the corner stop members to permit ejection of the sealed case.

References Cited
UNITED STATES PATENTS

| | | | |
|---|---|---|---|
| 3,397,624 | 8/1968 | Currie | 93—36.3 |
| 3,421,415 | 1/1969 | Pearson | 93—36.3 |
| 2,414,268 | 1/1947 | Moran. | |
| 2,815,700 | 12/1957 | Bowman. | |
| 2,925,758 | 2/1960 | Beetz. | |
| 3,125,007 | 3/1964 | Jaroff. | |
| 3,134,308 | 5/1964 | Ali-Oglu | 93—36.3 X |
| 3,291,008 | 12/1966 | Pierce | 93—36.3 |
| 3,298,288 | 1/1967 | Anderson. | |
| 3,312,154 | 4/1967 | Pierce | 93—36.3 |
| 3,333,514 | 8/1967 | Jones. | |

WAYNE A. MORSE, JR., Primary Examiner

U.S. Cl. X.R.

93—37, 51, 59